(12) United States Patent
Murching et al.

(10) Patent No.: US 6,526,169 B1
(45) Date of Patent: Feb. 25, 2003

(54) HISTOGRAM-BASED SEGMENTATION OF OBJECTS FROM A VIDEO SIGNAL VIA COLOR MOMENTS

(75) Inventors: Anil M. Murching, Beaverton, OR (US); Ali Tabatabai, Beaverton, OR (US); Thumpudi Naveen, Beaverton, OR (US)

(73) Assignee: Grass Valley (US), Inc., Nevada City, CA (US)

( * ) Notice: Subject to any disclaimer, the term of this patent is extended or adjusted under 35 U.S.C. 154(b) by 0 days.

(21) Appl. No.: 09/270,233

(22) Filed: Mar. 15, 1999

(51) Int. Cl.[7] ................................................ G06K 9/00
(52) U.S. Cl. ........................ 382/168; 382/165; 382/180
(58) Field of Search ................................ 382/162–167, 382/168–173, 176–180, 283, 224, 225, 286; 358/504–537, 462, 464; 345/597–605

(56) References Cited

U.S. PATENT DOCUMENTS 5,768,412 A * 6/1998 Mitsuyama et al. ........ 382/173
5,933,524 A * 8/1999 Schuster et al. ............ 382/168
6,148,092 A * 11/2000 Qian .......................... 382/118
6,167,167 A * 12/2000 Matsugu et al. ............ 382/283
6,246,803 B1 * 6/2001 Gauch ........................ 382/276

* cited by examiner

Primary Examiner—Jingge Wu
(74) Attorney, Agent, or Firm—Smith-Hill and Bedell

(57) ABSTRACT

A histogram-based segmentation of an image, frame or picture of a video signal into objects via color moments is initiated by defining a relatively large area within the object. The defined area is characterized by its color information in the form of a limited set of color moments representing a color histogram for the area. Based upon the set of color moments, color moments generated for small candidate blocks within the image, an automatically generated weighting vector, distance measures for the blocks from a central block in the object and a tolerance the area is grown to encompass the object to the extent of its boundaries. The initial set of color moments are then updated for the entire object. Those candidate blocks within the object serve to segment the object from the image.

3 Claims, 1 Drawing Sheet

HISTOGRAM-BASED SEGMENTATION OF OBJECTS FROM A VIDEO SIGNAL VIA COLOR MOMENTS

BACKGROUND OF THE INVENTION

The present invention relates to processing of video signals, and more particularly to a histogram-based segmentation of an image or video signal into visual objects via color moments.

In the processing of images or video signals it is desirable to be able to take an object, such as a tennis player, from one video signal or image and superimpose it upon another video signal or image. To this end keying systems were developed—either luminance or chrominance based. For example, in character generation luminance keying is typically used, while chrominance keying is used for placing a weather man in front of a weather map. Chrominance keying is based upon the object to be segmented, i.e., the weather man, being situated before a uniform color background, such as a blue screen. A key signal is generated that is one value when the color is blue and another value when the color is not blue. The key signal is then used to cut a hole in another video signal into which the segmented object is placed, thus superimposing an object from one video signal onto another.

In naturally occurring scenes there may be many objects against a non-uniform color background, such as tennis players and the ball against a crowd background. It may be desirable to segment an object from this scene in order to superimpose it upon another scene. In this situation conventional luminance and chrominance key generation techniques do not work.

What is desired is a method of segmenting an object from an image in a video signal using the colors of the object.

BRIEF SUMMARY OF THE INVENTION

Accordingly the present invention provides histogram-based segmentation of an image or video signal into objects via color moments. A user defines a relatively large area that lies entirely within an object of interest in one image, frame or picture from the video signal. An algorithm extracts characteristics of the user-defined area. Using these characteristics the algorithm grows the area to encompass the entire object of interest. The characterization of the area is made based on its color properties. Color moments representing a color histogram for the area are used for characterizing the color properties. Weighting factors and a threshold are automatically calculated for use in the characterization. At the conclusion the "characteristic" color moments for the object are updated.

The objects, advantages and other novel features of the present invention are apparent from the following detailed description when read in conjunction with the appended claims and attached drawing.

DETAILED DESCRIPTION OF THE INVENTION

Figure 1:
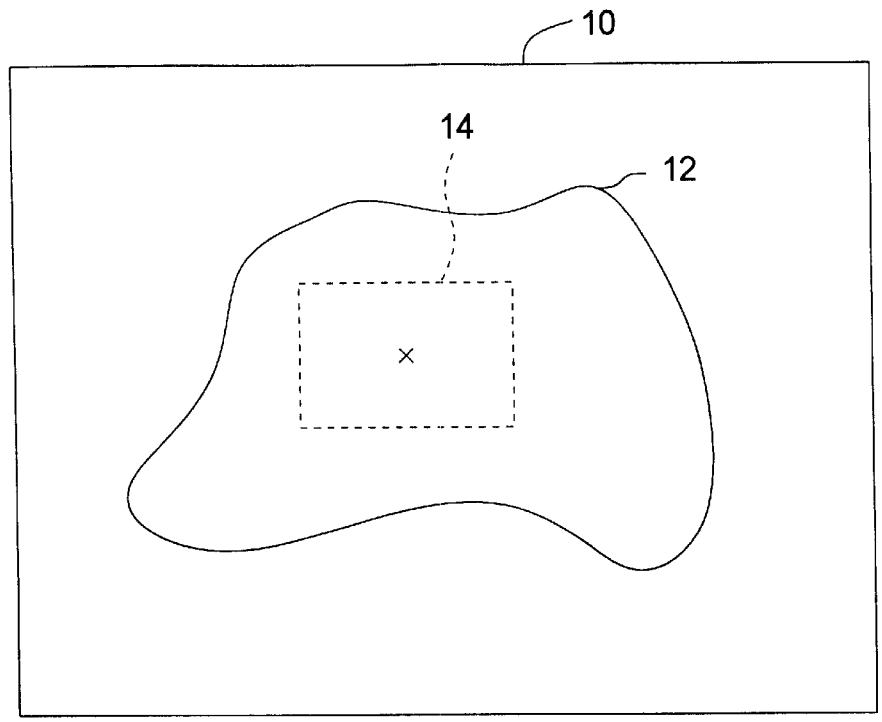
FIG. 1 is an illustrative view of an image from a video signal containing an object to be segmented according to the present invention.

The basic concept of the present invention is to perform semi-automatic extraction of an object of interest from a given color image, frame or picture of a video signal using color moments that represent a color histogram for the object. Referring now to FIG. 1 the color image 10 is shown with the object of interest 12. A user is asked to define a relatively large area 14, such as a rectangle, that lies entirely within the object of interest 12. A segmentation algorithm begins by characterizing the color information within the user-defined area 14. The use of color histograms for this purpose is a well-known technique. However such methods are subject to certain limitations: namely the color space has to be divided into a finite number of "bins", and selecting a good set of such bins is image-dependent and, therefore, less robust.

The use of color moments to represent a color histogram circumvents the problems presented by using color histogram methods by eliminating the need for explicit quantization of the color histogram into a number of bins. In the field of probability/statistics it is known that a histogram is uniquely specified by all its moments. The relationship is:

$$\Phi_{X1X2X3}(w_1, w_2, w_3) = FT\{h_{X1X2X3}(x_1, x_2, x_3)\} = \sum_{k,l,m=0}^{\infty} E\{X_1^k X_2^l X_3^m\}((jw_1)k/k!) * ((jw_2)l/l!) * ((jw_3)m/m!)$$

where X1, X2, X3 represent the three color components, $h_{X1X2X3}(.)$ is the three-dimensional histogram, $\Phi_{X1X2X3}(.)$ is the Fourier transform of the histogram, and $E\{X_1^k X_2^l X_3^m\}$ represents the moments.

Each pixel in the object 12 has three color components. For the present illustration the $Y, C_b, C_r$ domain is used. To characterize the histogram of the object, instead of an infinite set of moments as in the above equation, a finite number of color moments is used. For the present example 13 moments are used:

| | | |
|---|---|---|
| $E\{Y\}$ | $E\{C_b\}$ | $E\{C_r\}$ |
| $E\{Y^2\}$ | $E\{C_b^2\}$ | $E\{C_r^2\}$ |
| $E\{YC_b\}$ | $E\{C_bC_r\}$ | $E\{C_rY\}$ |
| $E\{Y^3\}$ | $E\{C_b^3\}$ | $E\{C_r^3\}$ |
| | $E\{YC_bC_r\}$ | |

From the large user-defined area 14 the above moments for that area may be calculated to provide a 13-point color moment vector $\{\zeta^*\}$ that characterizes the area where $\zeta^* = [E\{Y\}, E\{C_b\}, \ldots, E\{YC_b\}/\delta_y, \delta_{Cb}, \ldots]^T$.

In order to grow the user-defined area 14 into the complete object boundary 12, candidate blocks and a distance measure are used. The image 10 is divided into blocks of size P×Q, such as P=Q=2 pixels, and the color moment vector for each of these blocks is computed. The k-th block, whose color moment vector is denoted by the vector $\zeta_k$, belongs to the object 12 if:

$$\sum_{l=0}^{12} w_l |\zeta_k[l] - \zeta^*[l]| < T$$

where w is a thirteen point weighting vector and T is a threshold.

The weighting vector w and threshold T may be automatically calculated as follows. First subdivide the user-defined area 14 into P×Q non-overlapping blocks and find the color moment vectors $\zeta_j$ for each block. Then find the auto-covariance matrix $|R_c|$ defined as:

$$|R_c|\Delta E\{(\zeta-\mu)(\zeta-\mu)^T\}, \mu\Delta E\{\zeta\}$$

Then $w_l=1/\lambda_l$ where $\lambda_l$ is the l-th eigen value of $|R_c|$. This is equivalent to defining distance measure as $$d(\zeta_k,\zeta^*)\Delta(\zeta_k-\zeta^*)^T|R_c|^{-1}(\zeta_k-\zeta^*)$$

Some of the $\lambda_l$ may be zero and $|R_c|$ may be singular. Assuming that $|R_c|$ is almost diagonal so that $\lambda_l^2$ is the variance of the l-th component of the color moment vector, find $\lambda_{min}$ as the minimum of the non-zero eigen values of $|R_c|$. Then $$\lambda_l = \begin{cases} \lambda_1, & \lambda_1 > 0 \\ \lambda_{min}/10, & \lambda_1 = 0 \end{cases}$$

This gives a set of non-zero eigen values that are used in the distance measure.

To compute the threshold T, the distance measure $d(\zeta_k,\zeta^*)$ is calculated for all of the P×Q blocks within the user-defined area 14. Then $$d_{max}\Delta\max\{d(\zeta_k,\zeta^*)\}; d_{min}\Delta\min\{d(\zeta_k,\zeta^*)\}T\Delta d_{max}+\alpha(d_{max}-d_{min})$$

where $\alpha>0$ is tuned to the object 12, typically about 0.05.

With the distance measure, the threshold and the "characteristic" color moment vector $\zeta^*$, all the P×Q blocks may be found in the image 10 that are "close" to the user-defined area 14. From this collection of blocks a connected region is grown centered at the center of the user-defined area via morphological operations. The result is the segmentation of the object of interest 12 from the image 10 with a coarse boundary due to the size of the P×Q blocks. Correlating to a key signal, all of the values within the close blocks would have one value, and all other blocks would have another value.

Figure 2:
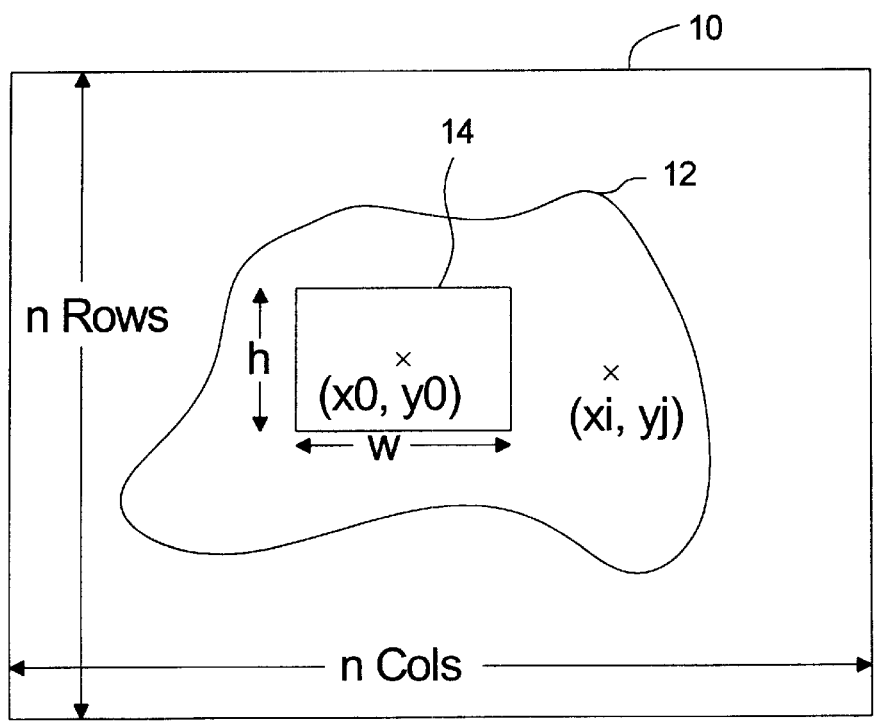
FIG. 2 is an illustrative view of the image of FIG. 1 for updating "characteristic" color moments for the object according to the present invention.

The segmented object may then used to update the characteristic color moment vector $\zeta^*$ to reflect the color content of the entire object. This is done via a weighted averaging of the color moment vectors of all P×Q blocks in the object, as illustrated in FIG. 2. For the $(x_j,y_j)$-th P×Q block in the object 12, where $(x_0,y_0)$ is the P×Q block located at the center of the user-defined area 14, compute:

$$\eta((x_j,y_j))=\exp[-10.0\{(x_j-x_0)^2+(h/w)^2(y_j-y_0)^2\}/\{nRows^2+(h/w)^2nCols^2\}]$$

Then the updated characteristic color moment vector is:

$$\underline{\zeta}^*_{updated} = \left\{\sum_{R'}\eta(x_j,y_j)\underline{\zeta}(x_j,y_j)\right\}/\sum_{R'}\eta(x_j,y_j)$$

where R' is the connected region identified as the object of interest.

Thus the present invention provides a histogram-based, semi-automatic segmentation of objects from a video signal via color moments without an explicit quantization of the corresponding color histogram into a small number of bins, the algorithm automatically determining distance measures, weights and a threshold and updating a "characteristic" color moment vector for the object.

What is claimed is:

1. A method of semi-automatically segmenting an image, frame or picture of a video signal into objects based upon histograms comprising the steps of:

defining a large area within the object, the object having boundaries;

characterizing color information within the defined large area by means of a finite number of color moments representing a color histogram; and growing the large area to the boundaries of the object using the color moments and wherein the growing step comprises the steps of:

dividing the image into a plurality of small candidate blocks;

determining the color moments for each of the blocks; and identifying the candidate blocks as belonging to the object when a weighted sum of the differences between the color moments for candidate blocks and the corresponding color moments for the defined area is less than a threshold.

2. The method as recited in claims 1 further comprising the steps of:

generating an auto-covariance matrix based upon the color moments for the candidate blocks, a weighting vector for the identifying step being a function of the values of the auto-covariance matrix;

defining a distance measure from the color moments for the candidate blocks and the defined area and from the auto-covariance matrix; and computing the threshold from the distance measures for all the candidate blocks.

3. The method as recited in claim 1 further comprising the step of updating the color moments for the defined area to reflect the color content of the entire object.

* * * * *